Patented June 10, 1924.

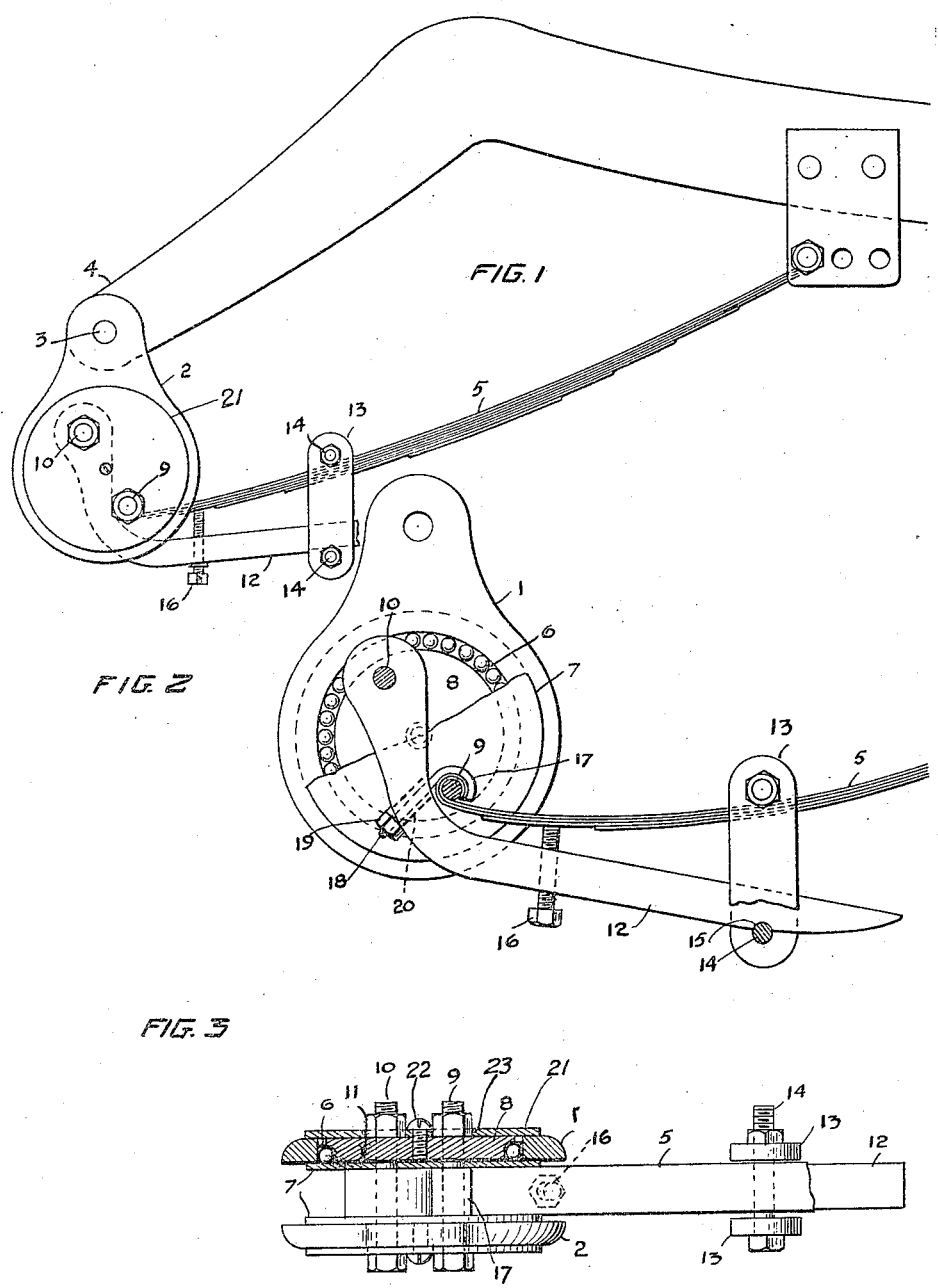

1,496,853

UNITED STATES PATENT OFFICE.

GEORGE P. INGRAM, OF CAMPBELL, CALIFORNIA.

SHOCK ABSORBER.

Application filed February 12, 1923. Serial No. 618,437.

*To all whom it may concern:*

Be it known that I, GEORGE P. INGRAM, a citizen of the United States, residing at Campbell, in the county of Santa Clara and State of California, have invented new and useful Improvements in Shock Absorbers, of which the following is a specification.

This invention relates to improvements in vehicle shock absorbers and resides in the provision of a simply constructed, small, compact and inexpensive device of this character which may be readily and easily attached to automobiles and will operate to effectively absorb and prevent excessive shocks and jars occasioned incident to running over rough and bumpy roads.

One of the objects of the invention is to provide a shock absorbing device of the character described which may be readily incorporated with the ordinary automobile without necessitating changing the construction of the springs or other parts of the automobile.

With the above mentioned and other objects in view, the invention consists in the novel construction and combination of parts hereinafter described, illustrated in the accompanying drawing, and set forth in the claims hereto appended, it being understood that various changes in the form, proportion, size and minor details of construction within the scope of the claims may be resorted to without departing from the spirit or sacrificing any of the advantages of the invention.

Referring to the drawing:

Fig. 1 represents a side elevation of the device of my invention as when attached to an automobile, one of the springs and a part of the automobile frame being shown.

Fig. 2 is an enlarged vertical sectional view taken through the center of the device of my invention showing a portion of the spring.

Fig. 3 is a horizontal sectional view taken on the line 3—3 of Fig. 2.

In the form of my invention shown in the accompanying drawing there is provided a shackle-like body portion which consists of two elongated pear shaped plates 1 and 2, which plates are pivoted as at 3 at their upper ends to the adjacent end of the vehicle frame 4 and depend from said frame. The pivot connection 3 may be provided with the holes as formerly employed to attach the spring 5. The plates 1 and 2 are provided with circular openings 6 in which are mounted circular bearing members 7. To provide for free movement of the members 7, ball bearing members 8 are mounted in the openings 6 and engage the members 7 and the plates 1 and 2 in the usual manner. The members 7 are secured to one another by bolts 9 and 10 which pass transversely through the members 7 and are secured in place by nuts 11, said bolts being mounted on opposite sides of the centers of the members 7. The spring 5 extends between the members 7 and the plates 8 and is fastened to the bolt 9 as shown in Fig. 2 whereby upon flexure of the spring, the members are turned or rotated as will be later more fully described.

As a means for regulating and controlling the action of the spring there is pivoted on the bolt 10 between the member 7 the shorter arm of an L-shaped lever member 12. The longer arm of the lever extends beneath the spring 5 and at its outer end is loosely connected with the spring by two plates 13, joined at their ends by bolts 14. One of the bolts rests in a groove 15 in the lower side of the lever and the other bolt extends across the upper side of the spring. This device regulates the action of the lever by limiting the movement of the latter away from the spring.

A set screw 16 is carried in the longer arm of the lever intermediate the ends of the arm and bears against the under side of the spring at a point near but spaced inwardly from the end thereof attached to the bolt 9. By adjusting this screw the action of the spring is regulated through the varying of the leverage action of said lever.

A hook 17 having a threaded shank 18 is adjustably secured by a nut 19 to the lever and the bill of the hook extends over the rolled end of the spring when the latter is attached to the bolt 9. By this arrangement the lever, spring and other parts of the device are securely held in operative relation. However, the lever has a slot 20 therein which permits the lever to move relative to the hook when the device is in action.

When the spring is under compression and tends to straighten out, the shackle comprising the plates 1 and 2 swings outwardly or rearwardly and upwardly and the members 7 rotate or turn from right to left, this latter movement being relative to the plates 1 and 2. As the member 7 through the lever is rocked forwardly and upwardly and the set screw presses upwardly on the spring it causes a pressure on the latter which will compensate the main or initial spring compressing force and thereby cushion the compression action of the spring. On the rebound the spring is prevented from sudden action due to the tension or pressure effected through the action of the members 7, lever 12 and set screw 16. By this arrangement the spring is so controlled that its action will be slow and smooth and free from quick, jerky compression and expansion movements usually occasioned incident to running over rough and bumpy roads.

The outer sides of the plates 1 and 2 have cover plates 21 held thereon by screws 22, there being openings 23 in the plates in which the heads and nuts on the bolts 9 and 10 are received. These plates protect the bearings from dirt, etc., and also act as nut locks.

I claim.

1. The combination with a vehicle frame and a vehicle spring attached to the vehicle, of a shackle pivoted on said frame, a member rotatably supported by the shackle, means for attaching one end of the spring to said member, a lever attached to said member and extending beneath the spring, and a bearing member on the lever engaging the under side of the spring.

2. The combination with a vehicle frame and a vehicle spring attached to the vehicle, of a shackle pivoted on said frame, a member rotatably supported by the shackle, means for attaching one end of the spring to said member, a lever attached to said member and extending beneath the spring, and an adjustable bearing member on the lever engaging the under side of the spring.

3. The combination with a vehicle frame and a vehicle spring attached to the vehicle, of a shackle pivoted on said frame, a member rotatably supported by the shackle, means for attaching one end of the spring to said member, a lever attached to said member and extending beneath the spring, and anti-friction bearing members operatively engaging between the rotatable member and the shackle.

4. The combination with a vehicle frame and a vehicle spring attached to the vehicle, of a shackle pivoted on said frame, a member rotatably supported by the shackle, means for attaching one end of the spring to said member, a lever attached to said member and extending beneath the spring, and a bearing member on the lever engaging the under side of the spring, said spring and lever being attached to said member on opposite sides of the center thereof.

5. The combination with a vehicle frame and a vehicle spring attached thereto, of a shackle pivoted to and depending from said frame, a circular member rotatably supported by said shackle, means for connecting one end of the spring to a point on the circular member to one side of the center of said member.

GEORGE P. INGRAM.